United States Patent
Elzur et al.

(10) Patent No.: US 9,007,971 B2
(45) Date of Patent: Apr. 14, 2015

(54) METHOD AND SYSTEM FOR HOLISTIC ENERGY MANAGEMENT IN ETHERNET NETWORKS

(75) Inventors: Uri Elzur, Irvine, CA (US); Scott Powell, Carlsbad, CA (US)

(73) Assignee: Broadcom Corporation, Irvine, CA (US)

(*) Notice: Subject to any disclaimer, the term of this patent is extended or adjusted under 35 U.S.C. 154(b) by 86 days.

(21) Appl. No.: 13/075,077

(22) Filed: Mar. 29, 2011

(65) Prior Publication Data

US 2011/0176447 A1    Jul. 21, 2011

Related U.S. Application Data

(63) Continuation of application No. 12/054,189, filed on Mar. 24, 2008, now Pat. No. 7,916,676.

(60) Provisional application No. 60/896,633, filed on Mar. 23, 2007.

(51) Int. Cl.
  *G08C 17/00*  (2006.01)
  *G06F 1/26*  (2006.01)
  *H04L 12/12*  (2006.01)

(52) U.S. Cl.
  CPC .............. *H04L 12/12* (2013.01); *Y02B 60/34* (2013.01); *Y02B 60/35* (2013.01)

(58) Field of Classification Search
  None
  See application file for complete search history.

(56) References Cited

U.S. PATENT DOCUMENTS

| | | | |
|---|---|---|---|
| 6,538,994 | B1 | 3/2003 | Horspool |
| 6,724,829 | B1 | 4/2004 | Tzuckerman |
| 6,795,450 | B1 | 9/2004 | Mills et al. |
| 6,807,235 | B2 | 10/2004 | Yano et al. |
| 6,856,597 | B1 | 2/2005 | Scott |
| 7,003,331 | B2 | 2/2006 | Cromer |

(Continued)

FOREIGN PATENT DOCUMENTS

| | | |
|---|---|---|
| EP | 1 694 023 | 8/2006 |
| WO | WO 2004/071010 | 8/2004 |

(Continued)

OTHER PUBLICATIONS

Gupta et al., "Dynamic Ethernet Link Shutdown for Energy Conservation on Ethernet Links." IEEE, Jun. 24, 2007. XP002524616.

(Continued)

*Primary Examiner* — Hassan Phillips
*Assistant Examiner* — Hicham Foud
(74) *Attorney, Agent, or Firm* — Oblon, McClelland, Maier & Neustadt, L.L.P.

(57) ABSTRACT

Aspects of a method and system for energy management are provided. In one embodiment based on expected activity in one or more nodes in a network, processing capabilities in the network may be matched with expected processing loads. Processing loads in a network node may be determined based on deep packet inspection of traffic transmitted/received by the node, inspection of data exchanged between subsystems in the node, a state of an operating system running in the node, data processed or waiting to be processed in the node, information exchanged between an energy management entity in the node and an energy management entity in one or more other nodes, computing tasks delegated to the node, and/or instructions transmitted along with a computing task delegated to the node.

26 Claims, 5 Drawing Sheets

(56) References Cited

U.S. PATENT DOCUMENTS

| | | | |
|---|---|---|---|
| 7,116,682 | B1 | 10/2006 | Waclawsky |
| 7,308,591 | B2 * | 12/2007 | Dubinsky ............... 713/324 |
| 7,315,967 | B2 | 1/2008 | Azenko |
| 7,543,166 | B2 * | 6/2009 | Zimmer et al. ............ 713/310 |
| 7,707,437 | B2 * | 4/2010 | Berenbaum et al. ........ 713/300 |
| 7,974,250 | B2 * | 7/2011 | Jang et al. ................ 370/338 |
| 8,161,304 | B2 * | 4/2012 | Hamilton ................ 713/320 |
| 2002/0154607 | A1 * | 10/2002 | Forstadius et al. ........ 370/311 |
| 2002/0172274 | A1 | 11/2002 | Carlson |
| 2003/0202655 | A1 * | 10/2003 | Nattkemper et al. ....... 379/413 |
| 2004/0073597 | A1 | 4/2004 | Caveney et al. |
| 2004/0088590 | A1 | 5/2004 | Lee et al. |
| 2006/0034295 | A1 | 2/2006 | Cherukuri et al. |
| 2006/0149985 | A1 * | 7/2006 | Dubinsky ............... 713/324 |
| 2007/0110360 | A1 | 5/2007 | Stanford |
| 2007/0206641 | A1 | 9/2007 | Egan |
| 2007/0219732 | A1 | 9/2007 | Creus et al. |
| 2007/0280239 | A1 | 12/2007 | Lund |
| 2007/0294557 | A1 * | 12/2007 | Dubinsky ............... 713/324 |
| 2008/0181156 | A1 | 7/2008 | Ecclesine |
| 2009/0122736 | A1 | 5/2009 | Damnjanovic et al. |
| 2010/0185883 | A1 * | 7/2010 | Hamilton ............... 713/320 |

FOREIGN PATENT DOCUMENTS

| | | |
|---|---|---|
| WO | WO 2005/071885 | 8/2005 |
| WO | WO 2006/126160 | 11/2006 |
| WO | WO 2007/012014 | 1/2007 |
| WO | WO 2007/058871 | 5/2007 |

OTHER PUBLICATIONS

Wael Diab, "Energy Efficient Ethernet and 802.1." Nov. 2007. XP002524617.

* cited by examiner

METHOD AND SYSTEM FOR HOLISTIC ENERGY MANAGEMENT IN ETHERNET NETWORKS

CROSS-REFERENCE TO RELATED APPLICATIONS/INCORPORATION BY REFERENCE

This patent application is a continuation of U.S. patent application Ser. No. 12/054,189 filed on Mar. 24, 2008, now U.S. Pat. No. 7,916,676, which claims benefit to U.S. Provisional Application No. 60/896,633, filed on Mar. 23, 2007.

The above stated applications are hereby incorporated herein by reference in their entirety.

FIELD OF THE INVENTION

Certain embodiments of the invention relate to networking. More specifically, certain embodiments of the invention relate to a method and system for holistic energy management in Ethernet networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases, there will in turn be more need for servers and more need for higher speed networks. Accordingly, the amount of power being consumed by networking devices as well as computing platforms and storage devices, and consequently the associated environmental and economic cost, is becoming enormous. Furthermore, as the network speed and number of servers continue to increase and the system power as well as the power required to drive the network at high speed continues to increase, ways to utilize energy more efficiently are becoming increasingly important. For example, as an increasing number of portable and/or handheld devices are enabled for Ethernet communications, power consumption is increasingly important to maximize battery life.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for holistic energy management in Ethernet networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for holistic energy management in Ethernet networks. In this regard, based on activity in one or more nodes in a network, power consumption and/or data rate(s) in the network may be controlled by adjusting computational capabilities of one or more nodes in the network and/or by adjusting a data rate of communication between two or more nodes in the network. Activity in a network node may be determined based on deep packet inspection of traffic transmitted and received by the node, inspection of data exchanged between a networking subsystem and a host subsystem in the node, a state of an operating system or application running in the node, a state of a hypervisor or similar hardware and/or software in a virtualized node, data processed or waiting to be processed in the node, information exchanged between an energy management entity in the node and an energy management entity in one or more other nodes, computing tasks delegated to the node, and/or information transmitted along with a computing task delegated to the node. Power consumption in a network node may be controlled by enabling and/or disabling one or more portions of one or more network nodes in the network and/or adjusting a frequency of one or more clock signals in one or more network nodes in the network and/or by placing portions of a node into a high(er) and/or low(er) power state. Power consumption may be controlled based on whether power over Ethernet is available on one or more links of the network. One or more nodes in the network may operate as power supplying equipment (PSE) and/or as powered equipment (PE) and power provided from one or more PSEs to one or more PEs may be based on activity in the PEs.

Figure 1:
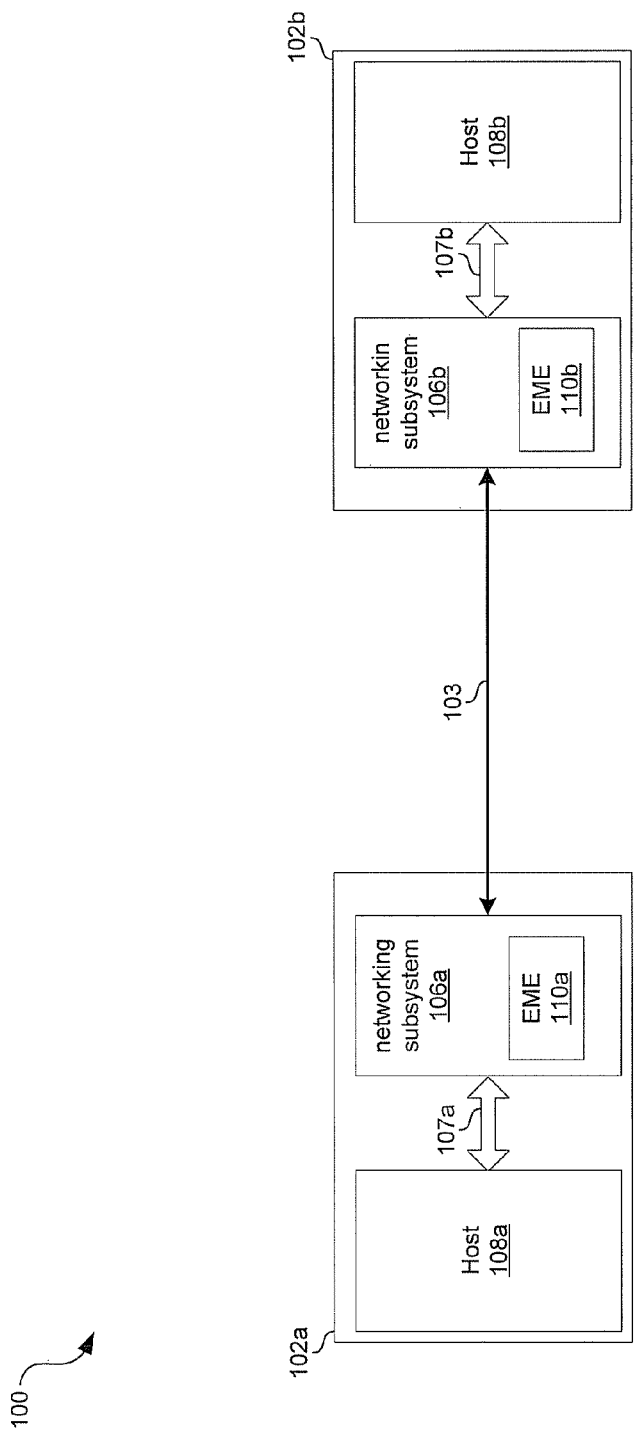
FIG. 1 is a block diagram illustrating a network connection between two network nodes, in accordance with an embodiment of the invention.

FIG. 1 is a block diagram illustrating a network connection between two network nodes, in accordance with an embodiment of the invention. Referring to FIG. 1, there is shown a system 100 that comprises a local network node 102a and a remote network node 102b. The local network node 102a and the remote network node 102b may communicate via a cable 103.

The cable 103 may comprise up to four or more physical channels, each of which may, for example, comprise an unshielded twisted pair (UTP), a channel in a backplane, or a fiber optic cable. However, physical media other than copper, backplane, and fiber optics may be utilized without deviating from the scope of the present invention. For example, digital subscriber line (DSL) over twisted pair standards may utilize one pair of UTP, Ethernet over twisted pair standards 10BASE-T and 100BASE-TX may utilize two pairs of UTP, and Ethernet over twisted pair standards 1000BASE-T and 10GBASE-T may utilize four pairs of UTP. Notwithstanding the standards on which communications between the network node 102 are based, various aspects of the invention may enable varying the number of physical channels via which data may be communicated.

The network nodes 102a and 102b may each comprise a host subsystem 108 and a networking subsystem 106. The networking subsystem 106 may provide an input/output interface in accordance with one or more of a variety of standards. In some exemplary embodiments of the invention, the networking subsystem 106 may interface with a local area network (LAN) and/or a storage area network (SAN) in accordance with networking protocols such as Ethernet, fiber channel over Ethernet (FCoE), small computer systems interface SCSI, internet SCSI (iSCSI), and remote direct memory access (RDMA) protocols.

The networking subsystems 106 may each comprise suitable logic, circuitry, and/or code that may enable communication, for example, transmission and reception of data, between the local network node 102a and the remote network node 102b. In various exemplary embodiments of the invention, the networking subsystems 106 may each enable multi-rate communications, such as 10 Mbps, 100 Mbps, 1 Gbps, 2.5 Gbps, 4 Gbps, 8 Gbps, 10 Gbps, 40 Gbps or 100 Gbps, for example. In this regard, the networking subsystems 106 may each support standard-based data rates and/or non-standard data rates. In various exemplary embodiments of the invention, the networking subsystems 106 may each support standard Ethernet link lengths or ranges of operation and/or extended ranges of operation. Additionally, the networking subsystems 106 may support transmission and/or reception at a high(er) data in one direction and transmission and/or reception at a low(er) data rate in the other direction. In this regard, one or more signals exchanged between the network nodes 102a and 102b may indicate or enable a transition in the data rate in one direction or both directions. In various exemplary embodiments of the invention, the networking subsystems 106 may enable operability and/or functionality of the seven layers (or a subset thereof) of the well known OSI model and the data transmitted and/or received by the networking subsystems 106 may be formatted accordingly. In this regard, the networking subsystems 106 may each provide the necessary services to the host subsystems 108 to ensure packets are suitably formatted and communicated between the networking subsystems 106 and the host subsystyems 108. For example, the networking subsystems 106 may each communicate with the host subsystems 108 via bus controller interfaces 107 which may correspond to, for example, peripheral component interconnect (PCI or PCI-X or PCIe) interfaces.

Each of the host subsystems 108 may comprise suitable logic, circuitry, and/or code for performing computations and/or executing instructions in the network node 102a. For example, the host subsystems 108 may perform computations and/or execute instructions to generate messages for transmission via their respective networking subsystems 106. Similarly, the host subsystems 108 may perform computations and/or execute instructions to process messages received via their respective networking subsystems 106. In this regard, an operating system may control tasks performed by the host subsystems 108 and/or manage availability and usage of resources in the host subsystems 108. Accordingly, the host subsystems 108 may comprise hardware and/or software which may be adapted to interface with the EME 110 and enable receiving and processing information from the energy management entities 110 in order to manage power consumption in the nodes 102. For example, the hardware and/or software may exclusively utilize information received from the EMEs 110 to manage power consumption, or may utilize information from the EMEs 110 in conjunction with other factors to make power management decisions. In the former case, the EMEs 110 may control power consumption in the network node 102 while in the latter case the EMEs 110 may influence power consumption but hardware and/or software in the host subsystems 108 may ultimately be responsible for power management.

Each of the networking subsystems 106 and/or the host subsystems 108 may comprise an EME 110. In the exemplary embodiment depicted, the networking subsystem 106a and 106b may comprise the EMEs 110a and 110b, respectively. Each of the EMEs 110a and 110b may comprise suitable logic, circuitry, and/or code that may enable managing power consumption in the network 100 by gathering and/or exchanging information to determine activity in the network. In this regard, information may be exchanged between, for example, the EME 110a and other portions of the network node 102a via an out of band channel such as a peripheral component interconnect (PCI) bus, a universal serial bus (USB), and an IEEE 1394 bus. Additionally, EME 110a and the EME 110b may communicate via an out of band channel over the link. An example of such an out of band channel is described in the IEEE 802.3 10GBASE-T standard. Other out of band channels are being contemplated by the IEEE802.3az task force to facilitate energy efficient networks.

In operation, the EMEs 110a and 110b may manage power consumption by controlling a data rate on the link 103 and/or by controlling, or influencing, computational capabilities of the nodes 102a and 102b. For example, aspects of the invention may enable controlling computational capabilities of the host subsystems 108a and 108b and/or of the networking subsystems 106a and 106b. In this regard, controlling the computational capability of a host subsystem 108 may comprise regulating the amount of data which the host 108 may process and/or the rate at which the host subsystem 108 may process data. In this manner, the host subsystem 108 may operate between 0 and 100% of its maximum computational capacity. For example, the computational capability of a host subsystem 108 may be reduced by reducing the frequency of one or more clock signals and/or by disabling, or placing into a low(er) power state, one or more blocks of logic, circuitry and/or code. Similarly, controlling the computational capabilities of the networking subsystems 106a and 106b may comprise regulating the amount of data the networking subsystems may store, packetize, transmit, receive, and/or otherwise process.

In operation, power consumption may be managed based on activity in the network nodes 102a and 102b. In this regard, the EME 110a may determine activity in the network nodes 102a and 102b by inspecting transactions between the networking subsystems 106a and 106b, inspecting transactions between the networking subsystem 106a and the host subsystem 108a, inspecting internal activities of the host subsystem 108a, and/or inspecting internal activities of the networking subsystem 106a. Similarly, the EME 110b may determine activity in the network nodes 102a and 102b by inspecting transactions between the networking subsystems 106a and 106b, inspecting transactions between the networking subsystem 106b and the host subsystem 108b, inspecting internal activities of the host subsystem 108b, and/or inspecting internal activities of the networking subsystem 106b. In this manner, the EMEs 110a and 110b may discover the activities and/or capabilities of their respective network nodes 102a and 102b. In this regard, the EMEs may be enabled to detect other EMEs and/or network nodes in the network that may participate in power and/or data rate management in accordance with various aspects of the present invention. Discovery of power and/or data rate management capabilities in a network may be implemented as a layer 2 protocol such as link layer discovery protocol (LLDP), a higher layer protocol, or a hop by hop mechanism such as a "Next page" in the autonegotiation.

In various embodiments of the invention, a dedicated protocol may be used to discover and exchange power management information between the EMEs 110a and 110b. In this regard, exemplary information exchanged may comprise power management policies, indications of actions to take to efficiently utilize power, and/or information as to the status of the network nodes and/or subsystems therein. Additionally, as part of the dedicated protocol a master EME may be elected to control, coordinate, or influence a group of EMEs.

Figure 2:
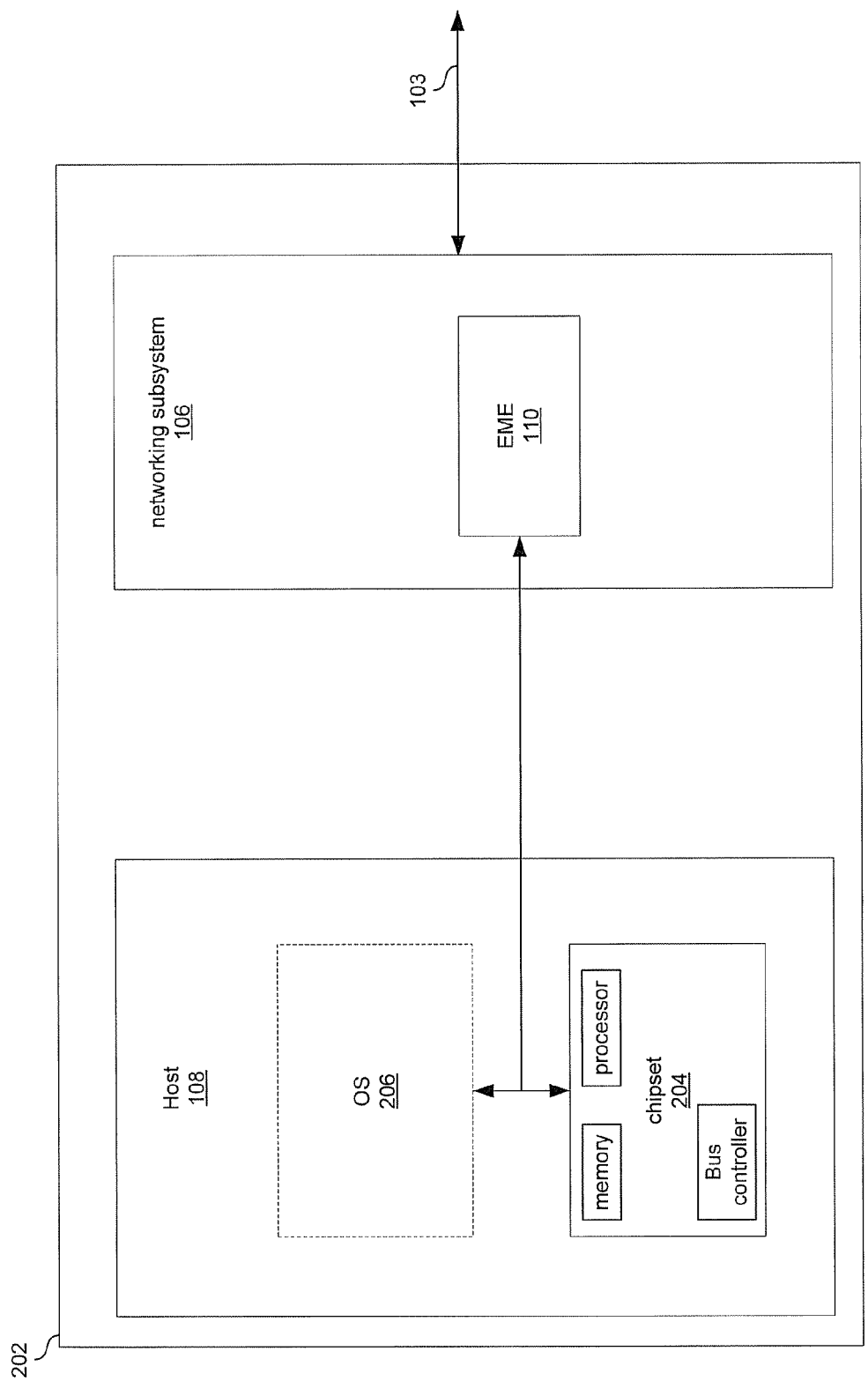
FIG. 2 is a block diagram of an exemplary network node comprising an energy management entity, in accordance with an embodiment of the invention.

FIG. 2 is a block diagram of an exemplary network node comprising an energy management entity, in accordance with an embodiment of the invention. Referring to FIG. 2, the network node 202 may comprise a host subsystem 108 and a networking subsystem 106 similar to or the same as the network nodes 102 described with respect to FIG. 1. Furthermore, the host subsystem 108 may comprise a chipset 202 and operations of the host subsystem 108 may be managed by an operating system 204.

Although FIG. 2 depicts a network node comprising a separate host subsystem and networking subsystem, the invention is not so limited. For example, the networking subsystem 106, the EME 110, and the host subsystem 108 may all be implemented in the chipset 204. For another example, the EME 110 may be implemented in the host subsystem 108 and may provide information for managing power consumption and/or data rate to the networking subsystem 106. In this regard, the networking subsystem 106 may comprise hardware and/or software adapted to enable receiving information for the EME 110 and utilizing that information to make power management and/or data rate decisions.

The chipset 204 may comprise suitable logic, circuitry, and/or code that may enable performing computational tasks. For example, the chipset 204 may comprise one or more processors, memory elements, and/or I/O controllers. Additionally, operations performed by the chipset 204 may be managed by the operating system (OS) 206. In this regard, the computational capability of the host subsystem 108 may be determined by the chipset 204 and the OS 206. Accordingly, to reduce the computational capability of the host subsystem 108, and thus reduce power consumption, portions of the chipset 204 and/or the OS 206 may be disabled and/or operated at a reduced speed. Similarly, to increase the computational capability of the host subsystem 108, and thus increase power consumption, portions of the chipset 204 and/or the OS 206 may be enabled and or operated at an increased speed. Of course maximum computational capability of a host subsystem 108 may be limited by, for example, maximum clock speeds or finite memory.

The energy management entity 110 may comprise suitable logic, circuitry, and/or code that may be enabled to control and/or influence data rates at which the network node 202 may communicate over the network link 103, power consumption associated with communicating data over the link 103, and/or power consumption of the node 202. In this regard, the energy management entity 110 may determine how and/or when to adjust the link speed (data rate) and the associated power consumption by inspecting ingress and egress traffic of the networking subsystem 106. Exemplary traffic types on the link 103 may comprise Ethernet, storage traffic such as iSCSI and/or FCoE, and clustering traffic such as RDMA over Ethernet. For example, the EME may inspect a transaction(s) on the link and determine a large transaction is completing. Consequently, the EME may generate an indication that a transition to a low(er) data rate and/or power consumption may be desirable. Conversely, the EME may inspect a transaction(s) on a link and determine that the link will soon become busy or that data requiring high(er) data rate (e.g. streaming media that may require lossless and/or low latency transmission). Consequently, the EME may generate an indication that transitioning to a reduced power consumption and/or data rate may be undesirable. The EME may also collect additional information on the nature of the host subsystem and/or network nodes to make better decisions on the right timing for a change in the power policy and/or data rate. Exemplary ways for controlling a data rate on the link 103 may comprise controlling a number of active channels on the link 103, controlling a signal constellation utilized for representing data on the link, controlling a symbol rate on the link, suspending transmission of data on the physical media, and/or controlling inter-frame gap times on the link. In this regard, the energy management entity 110 may provide one or more control signals to the networking subsystem 106 for controlling the data rate on the link 103. In this regard, in various embodiments of the invention, zero bps may be a valid data rate on the link 103. However, during periods of no data transmission, energy such as one or more layer 1 synchronization signals may still be conveyed on the link 103.

The EME 110 may control power consumption by attempting to match activity in the networking subsystem 106 to activity in the host subsystem 108. In this regard, the energy management entity 110 may monitor a state of and/or activity in the chipset 204 and/or the operating system 206. Accordingly, the energy management entity 110 may provide one or more signals to control and/or influence operations of the chipset 204 and/or the operating system 206. In various embodiments of the invention, the energy management entity 110 may determine if PoE is available to the networking subsystem 106 and decisions to power portions of the network node 202 may be based on the availability of PoE.

In operation, a number of factors may be utilized to determine or characterize the activity in the network node 202. In this regard, current and/or expected transactions in the host subsystem 108 and/or on the link 103 may be determined based on activity in the node 202. Accordingly, computational capabilities of the node 202 and/or data rates on the link 103 may be adjusted, for example, to a most energy efficient configuration that still meets the demands of the current and/or expected transactions. Exemplary factors which may be utilized to determine activity in the node 202 may comprise data currently being and/or waiting to be processed, data currently being or waiting to be transferred between portions of the chipset 204, data currently being or waiting to be transferred between the host subsystem 108 and the networking subsystem 106, a state of an application running in the node 202, and/or a state of the operating system 206. Another factor which may be utilized to characterize the activity in the node 202 may be the role of the node 202. For example, the node 202 may be a file server and the EME may ensure it is not turned off of slowed in the presence of some transactions (either by their size, importance, urgency, source, etc.). The EME 110 may inspect definition files to assess the role of the machine and for instance in case the physical node is subject to virtualization (e.g. VMware ESX), it may take into account the state of all Virtual machines (VMs or Guest OS) running on the node before determining any action. It may consult with a hypervisor, user, and/or scripts that control the node and the role of the VMs, the transactions driven by the VMs and their state etc. before taking any action for the node 202. Another factor which may be utilized to characterize the activity in the node 202 may be recent transactions on the link 103. In this regard, the node 202 may use deep packet inspection to determine the status and progress of network transactions. Furthermore, network transactions may comprise information exchanged between energy management entities and thus inspection of these transactions may enable determining activity in other network nodes.

In an exemplary embodiment of the invention, the EME 110 may determine that a large network transaction may be imminent. Accordingly, the EME 110 may provide an indication to the host subsystem 108 that high(er) computational capability may be needed and/or the EME 110 may provide an indication to the networking subsystem 106 that a high(er) data rate on the link 103 may soon be needed. The EME may also provide an indication to one or more remote network nodes to ensure link and node capabilities are preserved end to end.

In an exemplary embodiment of the invention, the EME 110 may determine that a large transaction may have just completed and that the nature of the node's role may not involve another large transaction for some time Accordingly, the EME 110 may provide an indication to the host subsystem 108 that it may transition to state having low(er) computational capabilities and/or the EME 110 may provide an indication to the networking subsystem 106 that it may transition to a low(er) data rate on the link 103. The EME may also provide indication to one or more remote network nodes to ensure link and node capabilities are preserved end to end. In generating the indication, the EME may take into account the time it takes one or more network nodes to transition back to a high(er) link rate and/or high(er) computational capabilities. For example, the EME may not generate an indication to go to a low(er) data rate if the time it may take to restore the high(er) data rate may result in the node being unable to satisfy a service level agreement (SLA) or quality of service (QoS) commitment.

In an exemplary embodiment of the invention, the EME 110 may determine that network transactions may be latency sensitive. Accordingly, the EME 110 may provide an indication to the host subsystem 108 that states having low(er) computational capabilities may be undesirable and/or the EME 110 may provide an indication to the networking subsystem 106 that a low(er) data rate on the link 103 may be undesirable. The EME may also provide indication to one or more remote network nodes to ensure link and node capabilities are preserved end to end In an exemplary embodiment of the invention, the EME 110 may determine that a large data back-up job has just completed. Accordingly, the EME 110 may provide an indication to the host subsystem 108 that a transition to a state having low(er) computational capabilities may be preferred and/or the EME 110 may provide an indication to the networking subsystem 106 that a transition to low(er) data rate on the link 103 may be preferred. The EME may also provide indication to one or more remote network nodes to ensure link and node capabilities are preserved end to end In an exemplary embodiment of the invention, the EME 110 may, during guest OS (GOS) migration in virtualization, for example, prevent a reduction in computational capabilities and/or link data rate(s) to ensure the migration is completed with no disruption and as quickly as possible.

In an exemplary embodiment of the invention, the EME 110 may determine that the node 202 may be consuming more power than agreed to in a service level agreement (SLA). Accordingly, the EME 110 may provide an indication to the host subsystem 108 that reduced computational capabilities may be required and/or the EME 110 may provide an indication to the networking subsystem 106 that a transition to low(er) data rate on the link 203 may be required.

Figure 3:
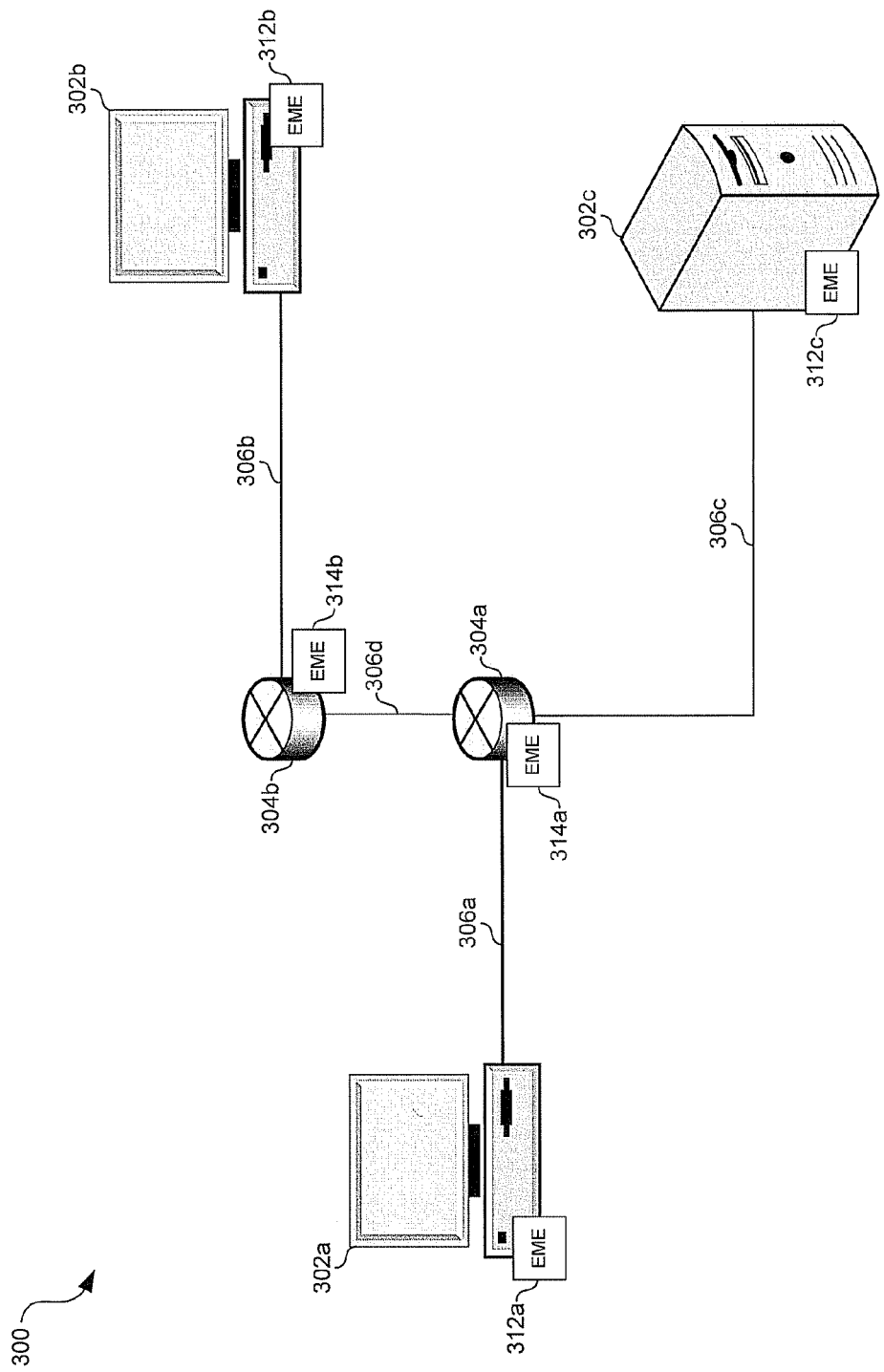
FIG. 3 is a diagram illustrating an exemplary network enabled to exchange information for controlling power consumption and/or data rates, in accordance with an embodiment of the invention.

FIG. 3 is a diagram illustrating an exemplary network enabled to exchange information for controlling power consumption and/or data rates, in accordance with an embodiment of the invention. Referring to FIG. 3 the network 300 may comprise network nodes 302a, 302b, 302c (collectively referred to as nodes 302) and network nodes 304a, 304b (collectively referred to as nodes 304) communicatively coupled via the links 306a, 306b, 3066, 306d (collectively referred to as links 306).

The nodes 302 may be similar to or the same as the node 202 described with respect to FIG. 2. Each of the nodes 302 may comprise an energy management entity 312, which may be similar to or the same as the energy management entity 110 described with respect to FIG. 3.

The network nodes 304 may comprise suitable logic, circuitry, and/or code that may enable transmitting and receiving of traffic over one or more network links. The network nodes 304 may each comprise, for example, switches, routers, and/or hubs. Similar to the nodes 302, the nodes 304 may each comprise an energy management entity. In an exemplary embodiment of the invention, the energy management entities 314 may be similar to, or the same as, the energy management entity 110 described with respect to FIG. 2. In various other embodiments of the invention, the network nodes 304 may be low complexity and/or may operate up to, for example, layer 2 or layer 3 of the Open System Interconnect (OSI) model. In this regard, the energy management entities 314 may be simplified in comparison to the energy management entities 312. For example, the energy management entities 314 may not make energy decisions but may simply implement decisions made by the energy management entities 312. In some cases, decisions can be made based on the identity of the communication partners, which can be derived from the Layer 2 and layer 3 addressing. However, operation at the Transport layer or layers above in the open systems interconnect (OSI) model may be required for the EMEs 312 and/or 314 to inspect packets and/or determine a state of transactions in the network 300.

In operation, information may be exchanged between the energy management entities 312 and 314 to coordinate power consumption and data rates in the network 300. In this manner, decisions made pertaining to data rates on the links 306 and computational capabilities of each of the nodes 302 and nodes 304 may be made by taking into account a portion of the network 300 or the network 300 as a whole. In an exemplary embodiment of the invention, the energy management entity 312a may determine that there may be little traffic on the link 306a. Additionally, the energy management entity 312a may discover that the node 302a may not perform any significant computing tasks in the near future. Moreover, information exchanged between the energy management entity 312a and the remaining energy management entities 312b, 312c, 314a, and 314b may indicate that the other nodes 302b and 302c also may not expect traffic to or from the node 302a in the near future. Accordingly, the energy management entity 312a may power down portions of the node 302a. Furthermore, the energy management entity 312a and the energy management entity 314a may negotiate and/or agree to a low(er) or zero data rate on the link 306a. The link speed in each direction on a given node or end to end for the communication link between network nodes that are subject to the EME governance may be separately determined.

The energy management entities may enable reducing power consumption without performance compromise and without oscillations resulting from too frequent power and/or data rate transitions. In this regard, time and/or complexity required to compute a proposed data rate, time and/or complexity required to determine current and/or future power consumption, time and/or complexity required to transition between network data rates, and/or a relationship between power consumption and network data rate may be taken into account when deciding on whether to alter data rate(s) and/or computational capabilities. This may be done end to end for a pair of communication partners and each network node along the path between the partners may make power and/or data rate management decisions independently. Power and/or data rate management decisions may also be directed at a group of machines and a one or more networks and/or portion(s) thereof associated with the group of machines may be set in a given link and power state in a coordinated fashion. For example a rack in a data center or a whole High Performance Computing (HPC) network when such computations are turned on/off or altered.

In operation, a data rate on a link 306 may be balanced with computational capabilities of a node communicatively coupled to that link. For example, the energy management entities 312a and 314a may balance a data rate on the link 306a with the computational capability of the node 302a. In this regard, computational capability of the node may comprise an amount of data the node may process and/or a rate at which the node may process data. In this regard, computational capabilities of a node may determine a load which that node may handle. Computational capability may, for example, be characterized by a number of instructions the node may execute in a time interval and/or an amount of data the node may manipulate, operate on, and/or otherwise process in a time interval. Thus, when portions of the node 302a are powered down or slowed down, a correspondingly low(er) data rate may be chosen for the link 306a. Similarly, when the node 302a is operating at max power and speed to maximize its computational capability, the link 306a may be operated at a high(er) data rate. In this regard, a data rate on a network link may be controlled based on computational capability of a node and/or node communicatively coupled to that link and/or based on the instantaneous load on the node from computation and/or I/O standpoint. Additionally, the converse may be true and the computational capability of a node or node may be controlled based on a data rate of a network link to which it is communicatively coupled.

Figure 4:
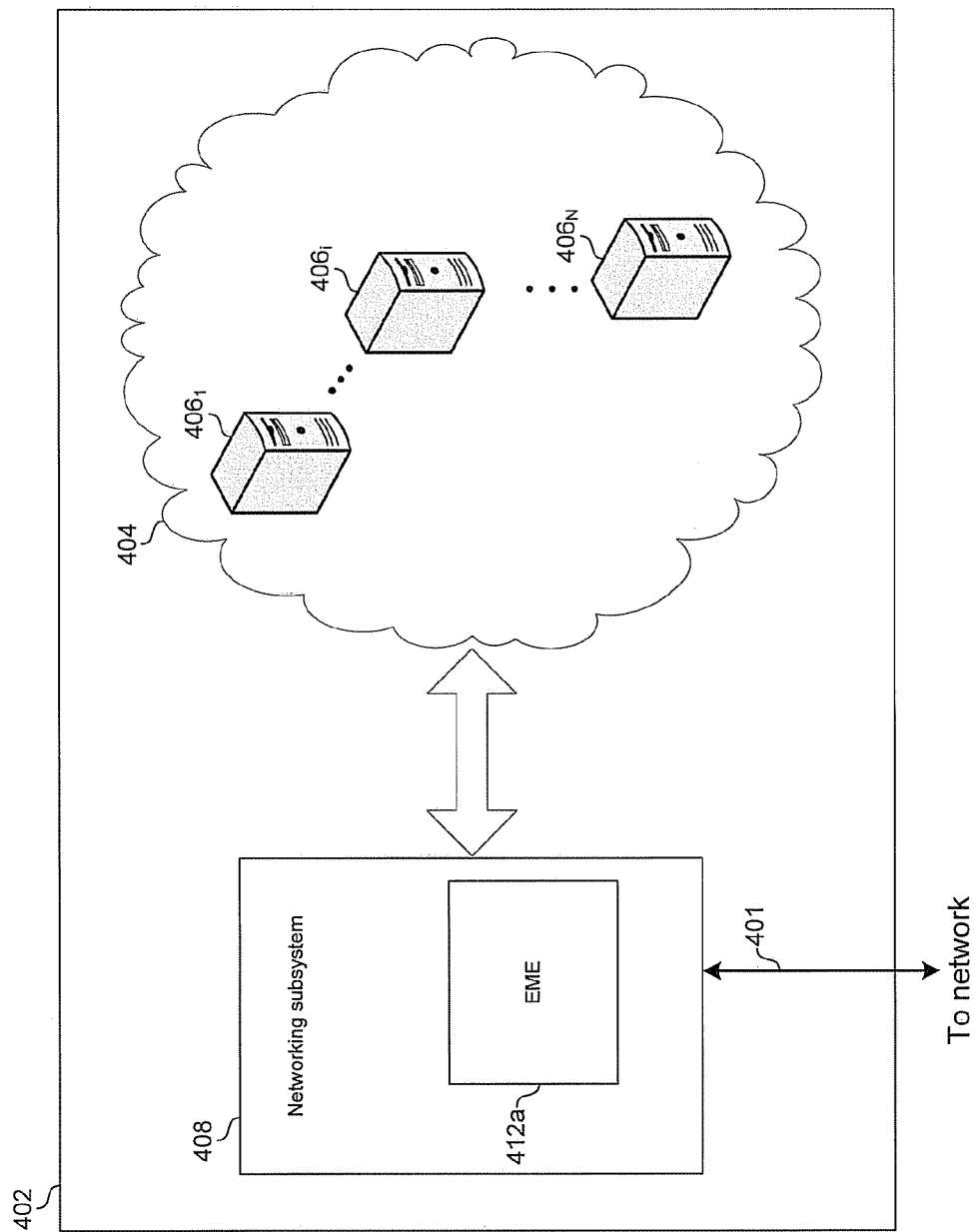
FIG. 4 is a diagram illustrating an exemplary network which may utilize virtualization for performing computing tasks, in accordance with an embodiment of the invention.

FIG. 4 is a diagram illustrating an exemplary system which may utilize virtualization for performing computing tasks, in accordance with an embodiment of the invention. Referring to FIG. 4, there is shown a computing system 402 that hosts a plurality of computing systems 406. In an exemplary embodiment of the invention, the computing system 402, may implement a virtual network 404 comprising a plurality of virtual machines (VMs) 406. The VMs 406 may each comprise a virtual networking subsystem, but not a physical networking subsystem. Accordingly, the VMs 406 may communicate with the external world over link 401 via the physical networking subsystem 408. The EME 412a may make power and/or data rate decisions for the system 402 based on the activity in one or more of the VMs 406 and based on activity in the networking subsystem 408. The EME 412a may therefore compute recommended data rates, recommended power consumption, and/or recommended computational requirements for one or more of the VMs 406. For example, VM $406_i$ may be idle on the network, but the EME 412a may not reduce the data rate on the link 401 because VM $406_j$ may, be committed to a SLA that may contradict the link requirements of VM $406_i$.

The EME 412a may be aware of the role of the host 402 and therefore may make power and/or data rate decisions and/or recommendations accordingly. Specifically, the EME 412a may be enabled to affiliate transaction types on the link 401, such as Ethernet for a LAN and iSCSI for a SAN, to an appropriate VM $406_i$ and analyze the computational and network requirements of each VM, in order to make a decision(s) regarding recommended data rates on the link 401, power consumption and/or computational capabilities of each VM 406, and/or power consumption and/or computational capabilities of the networking subsystem 408. Thus, various embodiments of the invention may utilize platform virtualization and/or resource virtualization.

Each of the virtual machines $406_1, \ldots, 406_N$, which may be collectively referred to as 406, may, be similar to or the same as the nodes 312 described with respect to FIG. 3, but may additionally feature a virtual networking subsystem. Each of the VMs 406 may comprise hardware and/or software which may be enabled to receive and/or process information from the EME 412a. Accordingly, information received from the EME 412a by the VMs 406 may be utilized to make decisions regarding data rates and/or computational capabilities. In some instances, information from the EME 412a may exclusively be utilized by the VMs 406 to mange power consumption while performing computing task(s). In other instances, information from the EME 412a may be utilized in conjunction with other information by the VMs 406 to manage power consumption while performing computing task(s).

In operation, the computing system 402 may receive computing task(s) from a network via the link 401 and may associate the computing task(s) with one or more VMs 406. In this regard, the computing system 402 may host different computing tasks on different VMs.

For example, a task for VM $406_i$ may comprise a large amount of data but may require little processing. Accordingly, the energy management entity 412a may provide information to VM $406_i$ which VM $406_{ix}$ may utilize to determine a data rate at which to expect large amounts of data over the link 403b. Furthermore, the energy management entity 412a may provide a recommendation to power up and/or increase the speed of memory elements and or other I/O allocated for VM $406_i$ but may power down and/or slow down processing cores in the VM $406_i$. Thus, in addition to the system 402 conveying a computing task to a selected computing system $406_i$, aspects of the invention may enable accompanying the task with information that enables performing the task in an energy efficient manner. In this regard, the energy management entity 412a may gather such information by inspecting traffic received via the link 401.

In another exemplary embodiment of the invention, the system 400 may be a multi-core processing platform and a hypervisor or other hardware and/or software on the system 402 may control Virtualization and may delegate computing tasks to one or more other processing cores 406.

Figure 5:
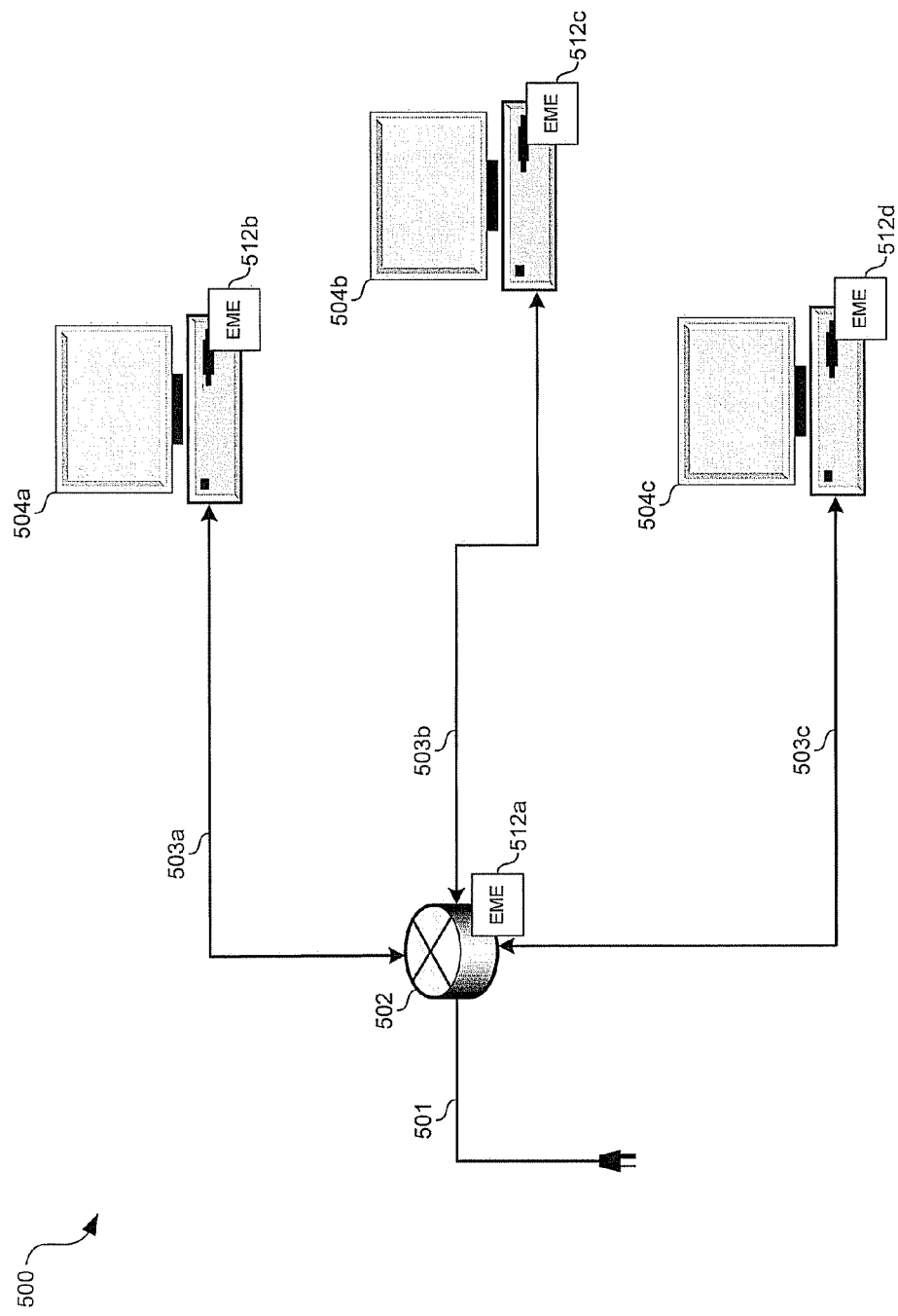
FIG. 5 is a diagram illustrating an exemplary network enabled to exchange information for managing distribution of power over Ethernet (PoE), in accordance with an embodiment of the invention.

FIG. 5 is a diagram illustrating an exemplary network enabled to exchange information for managing distribution of power over Ethernet (PoE), in accordance with an embodiment of the invention. Referring to FIG. 5 there is shown power supplying equipment (PSE) 502 and powered device (PD) 504a, 504b, 504c, which may be collectively referred to as PDs 504.

The PSE 502 may comprise suitable logic, circuitry, and/or code that may enable supplying power to a remote device over a network link. In this regard, the PSE 502 may adhere to PoE standards. The PSE 502 may comprise an energy management entity 512a which may be similar to or the same as the energy management entity 212 described with respect to FIG. 2.

The PDs 504 may comprise suitable logic, circuitry, and/or code that may enable receiving power via a network link. In this regard, the PSE 502 may adhere to PoE standards. Each of the PDs 504 may comprise an energy management entity 512 which may be similar to or the same as the energy management entity 212 described with respect to FIG. 2.

In operation, the PSE 502 may have a certain amount of power available to it via the connection 501. Additionally, the PSE 502 may be capable of handling or distributing a certain amount of power. Thus, the PSE 502 may supply power to one or more of the PDs 504 while taking into account the constraints of available power and the capabilities of the PSE 502. Accordingly, aspects of the invention may enable the PSE 502 to vary the amount of power supplied to each of the PDs 504. In this regard, the energy management entity 512a may be enabled to determine how much power to supply to each PD 504. Similarly, aspects of the invention may enable the PDs 504 to vary an amount of power they require from the links 503. In this regard, the energy management entities 512b, 512c, 512d may be enabled to determine how much power their respective nodes may need at a given time and/or determine how much power is available from the PSE 502 at a given time. Utilizing these determinations, the entities 512b, 512c, 512d may adjust power consumption in their respective nodes accordingly. In this regard, the energy management entities 512a, 512b, 512c may control computational capabilities in their respective nodes and/or may control a data rate on their respective links. Thus, the energy management entities 512 may exchange information to negotiate computational capabilities in the various nodes and/or nodes, to negotiate data rates on the links 503, and/or to negotiate power supplied on each of the links 503.

In an exemplary embodiment of the invention, the node 504a may be performing a computing task while the nodes 504b and 504c may be inactive. Accordingly, the energy management entities 512 may coordinate operations of their respective nodes such that higher power may be supplied on the link 503a and less power on the links 503b, 503c. In this regard, entity 512a may control the node 502 to divert more power to the link 503a, entity 512b may power up and/or speed up various components in the node 504a, and entities 512a and 512b may negotiate a high(er) data rate on the link 503a. Furthermore, entities 512c and 512d may power down and/or slow down various components of the nodes 504b and 504c and entities 512a, 512c, 512d may negotiate a slow(er) data rate on the links 503b and 503c.

Aspects of a method and system for holistic energy management in Ethernet networks are provided. In various embodiments of the invention, based on activity in one or more nodes, such as nodes 102, 202, 302, and 304, in a network, such as networks 100, 300, 404, and/or 500, power consumption in the network may be controlled via computational capabilities of one or more nodes in the network and/or via a data rate of communication between two or more nodes in the network. Activity in a network node may be determined based on deep packet inspection of traffic transmitted and received by the node, inspection of data exchanged between subsystems, such as the networking subsystems 106 and the host subsystems 108, in the node, a state of an application and/or operating system, such as the OS 206, running in the node, data processed or waiting to be processed in the node, information exchanged between an energy management entity in the node and an energy management entity in one or more other nodes, computing tasks delegated to the node, and/or information transmitted along with a computing task delegated to the node. Power consumption in a network node may be controlled by enabling and/or disabling, or placing into a high(er) and/or low(er) power state, one or more portions, such as portions of the OS 206 and/or the chipset 204, of one or more network and/or adjusting a frequency of one or more clock signals in one or more network nodes in the network. Power and link rates may be adjusted based on communication and computation requirements end to end or based on network topology and roles of computation or network elements. The invention allows a holistic control in a synchronized fashion of network, input output (I/O), and computational resources in multiple nodes. Power consumption may be controlled based on whether power over Ethernet is available on one or more links, such as the links 503 of the network 500. One or more nodes in the network may operate as power supplying equipment (PSE), such as the node 502, and/or as powered device (PD), such as the nodes 504, and power provided from the PSE 502 to the PEs 504 may be allocated based on activity in the PEs 504.

Another embodiment of the invention may provide a machine-readable storage, having stored thereon, a computer program having at least one code section executable by a machine, thereby causing the machine to perform the steps as described herein for exchanging information with an energy management entity within a network node wherein the energy management entity may be enabled to control power consumed in the network node and a data rate on a network link communicatively coupled to the network node.

Another embodiment of the invention may provide a machine-readable storage, having stored thereon, a computer program having at least one code section executable by a machine, thereby causing the machine to perform the steps as described herein for exchanging information with an energy management entity in a network node to enable the network node to control a power supplied to one or more network nodes over a network link.

Another embodiment of the invention may provide a machine-readable storage, having stored thereon, a computer program having at least one code section executable by a machine, thereby causing the machine to perform the steps as described herein for receiving a computing task to be delegated, inspecting the received task to determine computational capabilities which may be necessary for performing the task, selecting a computing element for performing the task, communicating instructions for performing the task to the selected computing element, wherein said instruction comprise information for optimizing power consumption of the selected element while performing the task.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    assessing, by management circuitry of a network device, a role of said network device in a network;
    determining, by said management circuitry, an expected processing load of a network subsystem of said network device based on data transmitted and received by the network device and based on data exchanged between a host subsystem and the network subsystem of the network device; and
    instructing, by said management circuitry, an operating system of said network device to increase or decrease a processing capability of said network device based on said expected processing load of said network subsystem, by notifying the operating system to increase a frequency of a clock in the host subsystem when a higher processing load on the network subsystem is expected, and notifying the operating system to decrease the frequency of the clock in the host subsystem when a lower processing load on the network subsystem is expected.

2. The method according to claim 1,
    wherein determining said expected processing load further comprises inspecting ingress and egress of network transactions to determine said expected processing load.

3. The method according to claim 1, further comprising:
    receiving processing load information from other network devices communicatively coupled to said network device; and
    coordinating management circuitry of other network devices based on the processing load information.

4. The method according to claim 1, wherein determining said expected processing load further comprises performing deep packet inspection on traffic received via said networking subsystem.

5. The method according to claim 1, further comprising controlling a state of said operating system according to a service level agreement by which said network device is bound.

6. The method according to claim 1, wherein said network device comprises a dedicated energy management entity for performing said determining and said instructing.

7. The method according to claim 1, further comprising communicating said expected processing load to other network devices communicatively coupled to said network device.

8. The method according to claim 1, further comprising controlling a state of one or more applications running on said network device such that said processing capability of said network device corresponds to said expected processing load of said network subsystem.

9. The method according claim 1, wherein instructing said operating system comprises at least one of enabling or disabling at least a portion of said operating system.

10. The method according to claim 1, wherein assessing said role of said network device comprises inspecting definition files of said network device.

11. The method according to claim 1, wherein assessing said role of said network device comprises inspecting definition files of said network device to determine whether said network device is subject to virtualization.

12. The method according to claim 11, further comprising, when said network device is subject to virtualization, said assessing said role of said network device further comprises determining a state of at least one virtual machine running on said network device.

13. The method according to claim 11, further comprising, when said network device is subject to virtualization, said assessing said role of said network device further comprises determining a state of each of a plurality of virtual machines running on said network device.

14. The method according to claim 1, further comprising:
    accounting for an amount of time to transition said network device back to a higher processing capability, wherein:
    instructing said operating system further comprises instructing said operating system to match said processing capability based on said amount of time.

15. The method according to claim 1, further comprising:
    negotiating a capability of said network device with a management entity based on said expected processing load of said network device, said capability of said network device comprising at least one of a processing rate of said network device, an amount of power supplied to said network device, or a data rate at which said network device may communicate, wherein:
    instructing said operating system further comprises instructing said operating system according to said negotiating.

16. A system comprising:
    a host of a network device; and
    a networking subsystem of said network device, said networking subsystem configured to:
        assess a role of said network device in a network;
        determine an expected processing load of said networking subsystem based on data transmitted and received by the network device and based on data exchanged between the host and the networking subsystem; and
        instruct an operating system of said network device to increase or decrease a processing capability of said network device based on said expected processing load of said network subsystem, by notifying the operating system to increase a frequency of a clock in the host when a higher processing load on the network subsystem is expected, and notifying the operating system to decrease the frequency of the clock in the host when a lower processing load on the network subsystem is expected.

17. The system according to claim 16, wherein said networking subsystem is further configured to inspect ingress and egress of network transactions to determine said expected processing load.

18. The system according to claim 16, wherein said networking subsystem is further configured to:
    receive processing load information from other network devices communicatively coupled to said network device; and
    coordinate other network devices based on the processing load information.

19. The system according to claim 16, wherein said networking subsystem is further configured to perform deep packet inspection on traffic received via said networking subsystem.

20. The system according to claim 16, wherein said networking subsystem is further configured to control a state of said operating system according to a service level agreement by which said network device is bound.

21. The system according to claim 16, wherein said network device further comprises a dedicated energy management entity configured to determine said expected processing load and instruct said operating system.

22. The system according to claim 16, wherein said networking subsystem is further configured to communicate said expected processing load to other network devices communicatively coupled to said network device.

23. The system according to claim 16, wherein said networking subsystem is further configured to control a state of one or more applications running on said network device such that a processing capability of said network device corresponds to said expected processing load of said network subsystem.

24. The system according claim 16, wherein said networking subsystem is further configured to control a state of said operating system to enable certain portions of said operating system.

25. A method comprising:
assessing, by management circuitry, a role of a network device in a network;
determining, by said management circuitry, an expected processing load of a network subsystem of said network device based on data transmitted and received by the network device and based on data exchanged between a host subsystem and the network subsystem of the network device;
instructing, by said management circuitry, an operating system of said network device to increase or decrease a processing capability of said network device based on said expected processing load of said network subsystem, by notifying the operating system to increase a frequency of a clock in the host subsystem when a higher processing load on the network subsystem is expected, and notifying the operating system to decrease the frequency of the clock in the host subsystem when a lower processing load on the network subsystem is expected; and
coordinating management circuitry of other network devices based on said expected processing load.

26. The method according to claim 25, wherein determining said expected processing load further comprises inspecting ingress and egress of network transactions between said network subsystem and a host subsystem of said network device, to determine said expected processing load.

\* \* \* \* \*